United States Patent [19]
Jönsson et al.

[11] Patent Number: 5,867,772
[45] Date of Patent: Feb. 2, 1999

[54] CELLULAR TELEPHONE ASSEMBLY AND METHOD FOR ASSEMBLING A CELLULAR TELEPHONE

[75] Inventors: Anders Jönsson, Durham, N.C.; Magnus Bäckmark, Lund; Fredrick Palmqvist, Malmö, both of Sweden

[73] Assignee: Ericsson, Inc., Research Triangle Park, N.C.

[21] Appl. No.: 610,603

[22] Filed: Mar. 8, 1996

[51] Int. Cl.[6] ....................................................... H04Q 7/32
[52] U.S. Cl. .............................. 455/90; 455/550; 455/575
[58] Field of Search ............................ 455/550, 90, 575; 379/370, 428, 429, 433, 440, 396

[56] References Cited

U.S. PATENT DOCUMENTS

| | | |
|---|---|---|
| 4,471,493 | 9/1984 | Schober . |
| 4,912,602 | 3/1990 | Zurek et al. . |
| 5,241,592 | 8/1993 | Carlson et al. . |
| 5,357,065 | 10/1994 | Mitamura et al. . |
| 5,357,570 | 10/1994 | Tomura et al. . |
| 5,397,867 | 3/1995 | Demeo . |
| 5,546,457 | 8/1996 | Tomura et al. . |
| 5,555,550 | 9/1996 | Kaschke . |

FOREIGN PATENT DOCUMENTS

| | | |
|---|---|---|
| 0 501 820 | 2/1992 | European Pat. Off. . |
| 0 685 954 | 5/1995 | European Pat. Off. . |
| 2 201 038 | 11/1967 | United Kingdom . |

OTHER PUBLICATIONS

Yamashita, Masayoshi et al., *Development of the Essential Portable Phone "Hot Dog"*. NEC Research and Development. vol. 35, No. 1, Jan. 1994.

*Primary Examiner*—Dwayne D.
*Assistant Examiner*—Linwood C. Scott, Jr.
*Attorney, Agent, or Firm*—Burns, Doane, Swecker & Mathis, L.L.P.

[57] ABSTRACT

A cellular telephone assembly includes a front shell having a mounting pin and a locating pin, and having a plurality of keyholes, a base shell having a mounting pin and a locating pin, and a light guide formed of substantially translucent material and having a substantially planar shape, the light guide having a mounting boss with a hole therethrough, the centering pins of the front shell and base shell being insertable in the hole from opposite side thereof and frictionally engageable therein, the light guide further having a locating hole, the locating pins of the front shell and base shell being insertable in the locating hole. The mounting pins and locating pins of the front and base shells cooperate with the mounting boss and locating hole of the light guide for ready alignment and fastening of the components. The invention includes a method for assembling the components, which allows the formation of convenient sub-assemblies of the components before final assembly.

12 Claims, 5 Drawing Sheets

CELLULAR TELEPHONE ASSEMBLY AND METHOD FOR ASSEMBLING A CELLULAR TELEPHONE

The present invention is directed to devices such as cellular telephones that have front and rear shells and lighted displays and keyboards. In addition, the invention is directed to method for assembling such a device in which subassemblies are readily formed to facilitate the handling of components.

BACKGROUND AND SUMMARY

Cellular telephones typically include several parts that must be assembled within front and base shells or covers. These parts include the display, the keypad, a light guide for distributing light to the display and keypad, and a printed circuit board that contains the telephone's electronics. In addition, a telephone generally includes other components such as a microphone and speaker.

Assembly of such a telephone can be difficult because of the small size and delicate nature of the parts, and because of the relative position and orientation in which the parts must be assembled.

The present invention provides a method of assembling a cellular telephone that facilitates the assembly process. The method of assembly of the invention permits the formation of subassemblies of the parts, which may then be more easily handled for further assembly or processing prior to final assembly.

The present invention also provides a cellular telephone having a light guide that facilitates the alignment and fastening of the front and base shell of the telephone. The light guide according to the invention includes a mounting hole positioned in a central region of the light guide and a locating hole positioned remote from the mounting hole. Pins in the front and base shells are aligned with the mounting hole and locating hole to facilitate assembly of the shells.

Alternatively, a mounting pin and locating pin may be provided in only one of the front shell and the base shell, the pins having sufficient length to extend through the components that form a subassembly, as further described below.

The mounting boss and locating hole in the light guide, and, correspondingly, the mounting pins and location pins in the front shell and rear shell are located to facilitate the alignment f unction. Preferably, the mounting boss and mounting pins are formed a central portion of the light guide and shells, respectively, and the locating hole and locating pins are formed near an edge of the light guide and shells.

According to another aspect of the invention, the pins in the front and rear shells that mate with the mounting hole of the light guide are shaped for securable engagement with the mounting hole for fastening of the light guide and front and rear shells. The pins and the mounting hole may be shaped for a force fit, for frictional engagement, or with a detent and mating groove, for example.

According to the method of the invention, a front shell subassembly may be formed by placing a keypad having a plurality of keys in a front shell with the keys extending through keyhole in the front shell, positioning the light guide in the front shell, fastening the light guide to the front shell by frictionally engaging a mounting pin on the front shell with a mounting hole in the light guide, and inserting a locating pin on the front shell in a locating hole in the light guide.

According to another aspect of the method, the base shell may be fastened to the front shell subassembly by the steps of aligning the base shell with the front shell by positioning a base shell mounting pin with the mounting hole in the light guide, and positioning a locating pin in the base shell with the locating hole in the light guide, and fastening the base shell to the front shell by frictionally engaging the base shell mounting pin in the mounting hole in the light guide.

The method in accordance with the invention further includes the step, before fastening the base shell to the front shell, of positioning a printed circuit board in the base shell by aligning holes in the printed circuit board with the mounting pin and locating pin of the base shell so that the pins extend through the holes in the printed circuit board.

According to another aspect of the invention, the light guide has a shape that improves the distribution of light to a display and keyboard, illuminating the display and keyboard in a more uniform manner that substantially eliminates dark and bright areas. The light guide of the invention more provides a light source coupling to receive and transmit light more efficiently into the light guide, thus, more effectively distribute light throughout the light guide. Accordingly, a light guide of the invention provides a brighter display and keys, and may require fewer light sources than conventional light guides. The light guide may thus saves manufacturing expense and time, component cost, and reduces battery energy consumption in the completed device.

According to the invention, the light guide comprises an element formed of a translucent material having an upper surface, a lower surface and a peripheral edge. The element is preferably a planar, rectangular component shaped to correspond to the keyboard and display of a telephone.

According to the invention, a plurality of light coupling recesses is provided on the peripheral edge to transmit light into the light guide. The light coupling recesses are preferably arcuately shaped, and more preferably semicircular. This feature helps to guide light from light sources uniformly into the light guide, thus avoiding bright and dark regions. In a preferred embodiment of the invention, the light coupling recesses are positioned on one side of the light guide in equally spaced relationship. In this way, a maximum amount of useful light is transmitted to illuminate a desired portion of the light guide, for example, that portion serving as a display screen backing. Alternatively, the light coupling recesses may be positioned as convenient around the periphery of the light guide for a desired illumination pattern.

According to another aspect of the invention, a plurality of reflecting recesses are provided on the peripheral edge of the light guide to reflect light striking the edge toward the key holes. According to a preferred embodiment of the invention, the reflecting recesses are positioned between adjacent keys hole locations. The reflecting recesses may be arcuately shaped or formed with two or more facets. According to a preferred embodiment, the reflecting recesses are V-shaped.

According to yet another aspect of the invention, the upper and lower surfaces of the element may be formed as glossy reflective surfaces, which facilitates the transmission of light through the light guide while minimizing the leakage of light from the surfaces.

BRIEF DESCRIPTION OF THE DRAWINGS

The invention may be more fully understood through the following description in conjunction with the appended drawings, in which.

DETAILED DESCRIPTION

Figure 1:
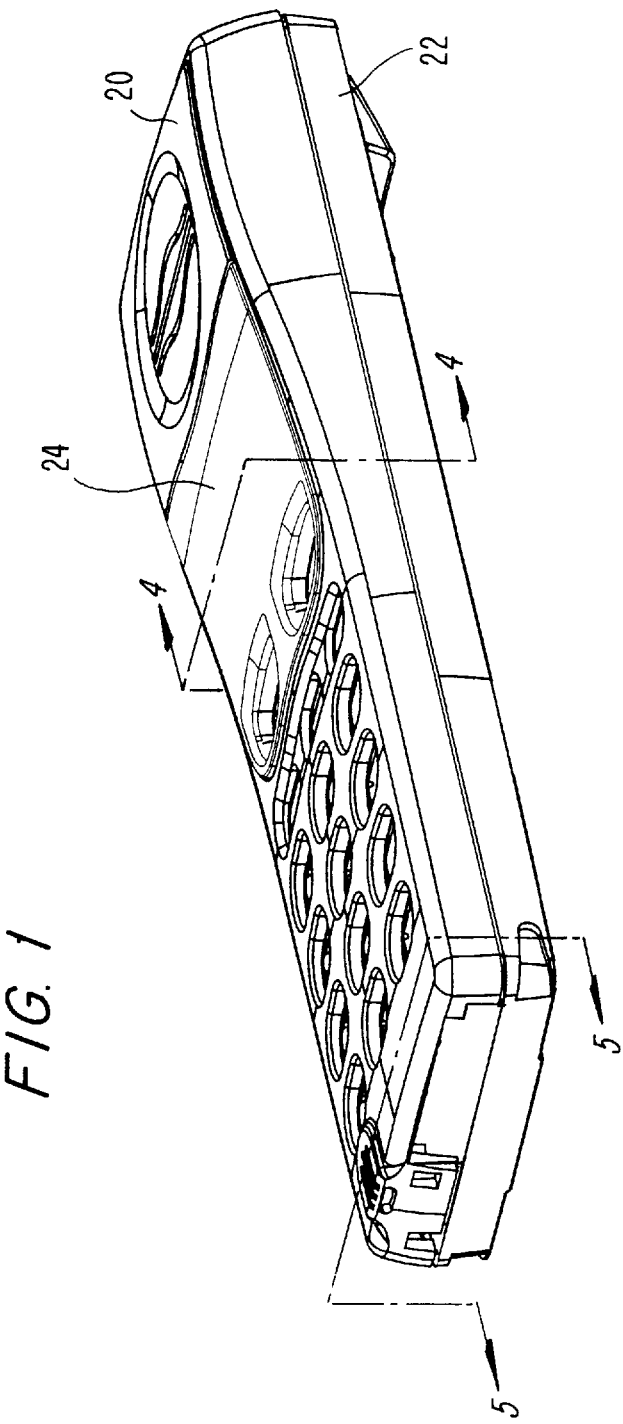
FIG. 1 is a perspective view of a cellular telephone in accordance with the invention.
Figure 2:
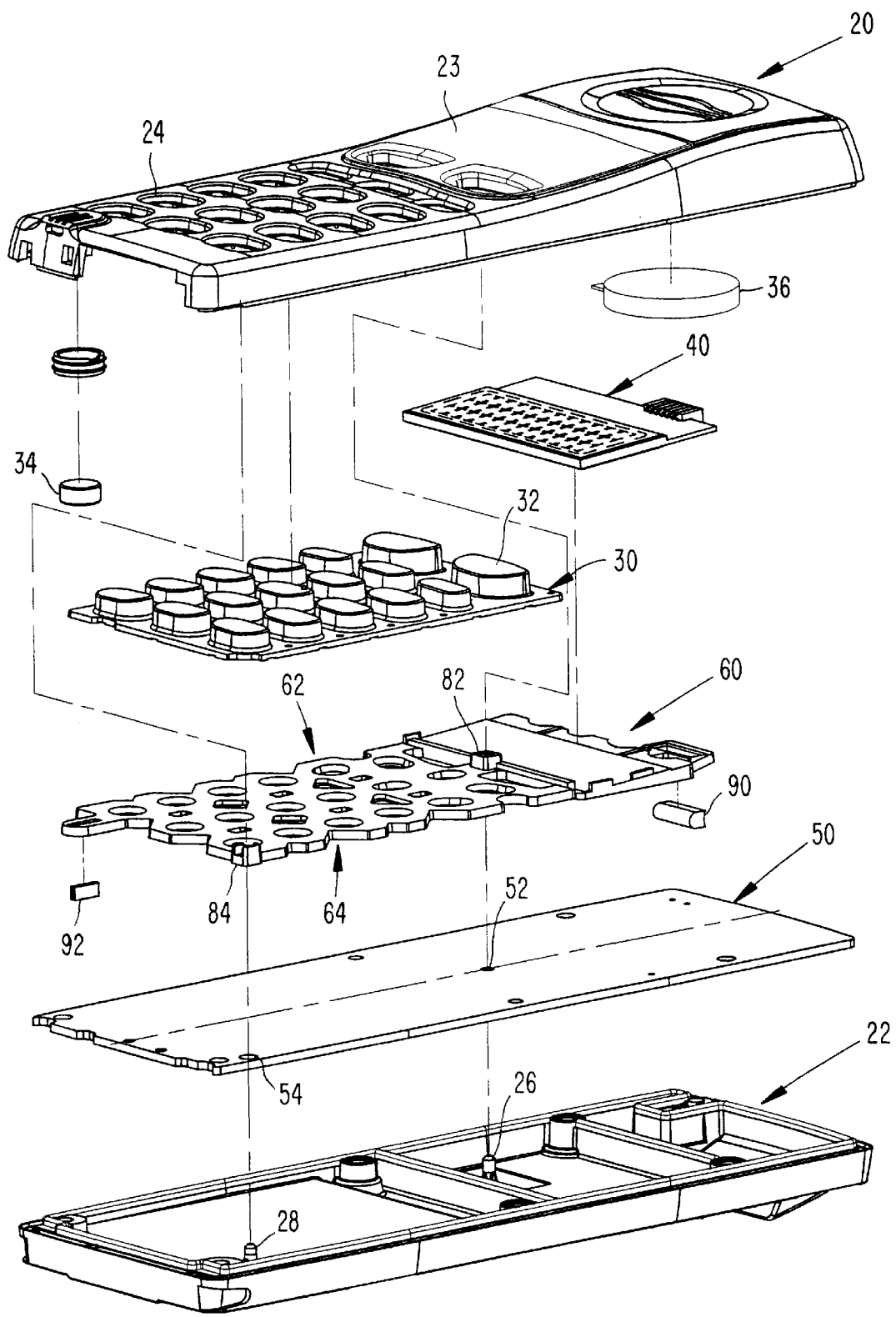
FIG. 2 is an exploded view of a cellular telephone which illustrates a method of assembly in accordance with the invention.

FIG. 1 is a perspective view of a cellular telephone assembly in accordance with the invention, and FIG. 2 shows an exploded view of the assembly shown in FIG. 1. The telephone includes a front shell 20 and a base shell 22 that enclose the device. The front shell 20 includes a display screen window 23, and a keypad area with a plurality of key holes 24. A keypad 30 having a plurality of keys 32 is positioned in the front shell 20 so that the keys 32 protrude through the key holes 24 in the front shell.

A display screen 40 is positioned adjacent to the window 23 in the front shell 20. The window 23 may include a glass cover attached to the front shell 20, or, alternatively, a glass cover may be mounted directly to the display screen 40. The display screen 40 is preferably a liquid crystal display. A printed circuit board 50 is disposed in the telephone adjacent to the base shell 22. The printed circuit board 50 supports the telephone's electronic components and circuitry.

A light guide 60 is disposed between the printed circuit board 50 and the keypad 30 and display screen 40. The light guide 60 distributes light from light sources, for example, LEDs, (not illustrated) mounted on the printed circuit board 50 to the display panel 40 and keypad 30 for illuminating the display panel and keys.

Figure 3:
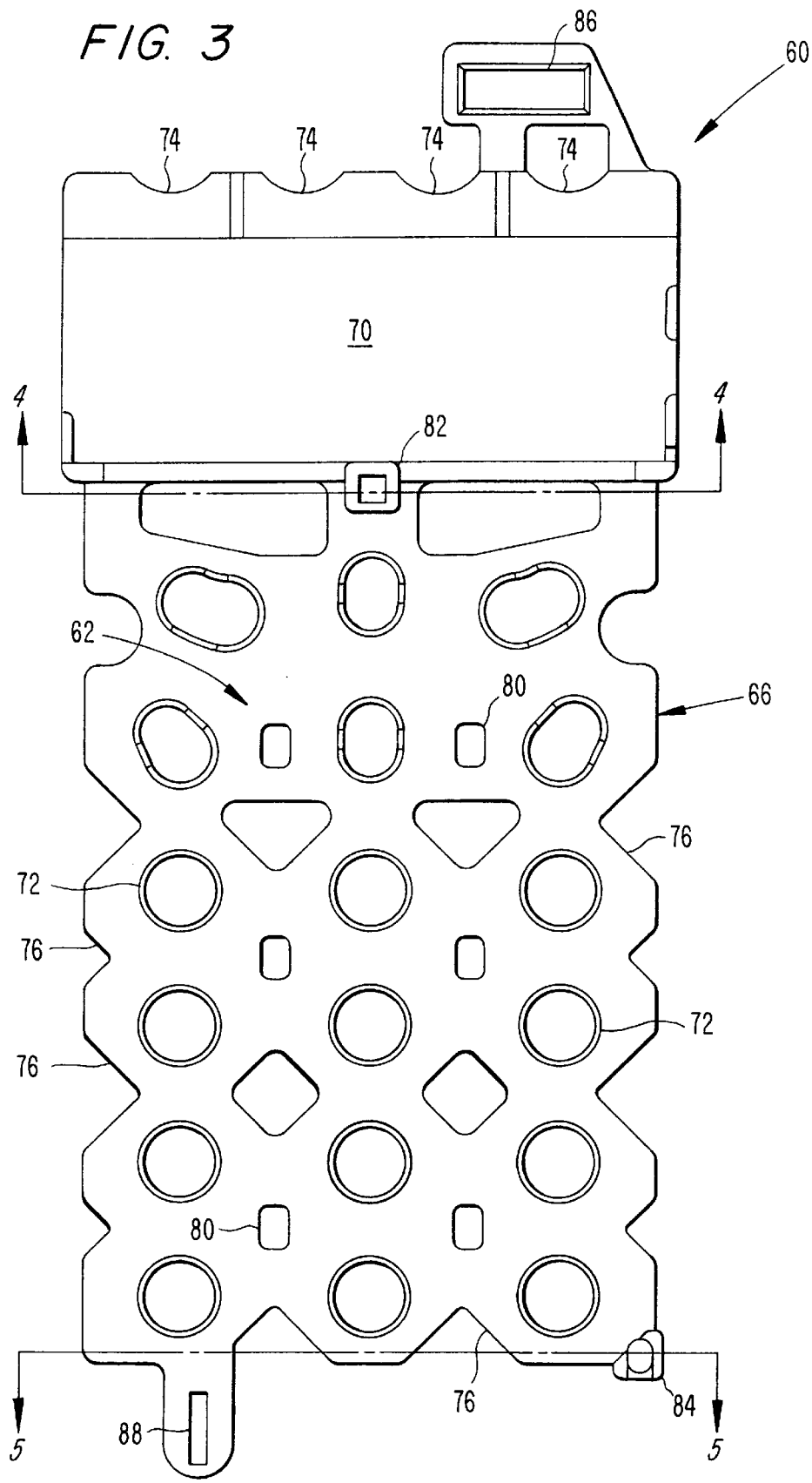
FIG. 3 is a top view of a light guide in accordance with the invention.

FIG. 3 is a top view of the light guide 60 in accordance with the invention. The light guide 60 comprises an element formed of a translucent material having an upper surface 62 that faces the front shell 20, a lower surface 64 (not shown in FIG. 3) that faces the base shell 22, and a peripheral edge 66. The light guide is preferably a planar, rectangular component shaped to correspond to the keypad 30 and display screen 40. The light guide 60 includes a screen backing area 70 and a keypad area having a plurality of key holes 72. A reflective strip 71 is attached to the screen backing area to reflect light toward the display screen 40.

As may be understood by reference to FIG. 1 and FIG. 2, the action of pressing the keys at the front shell 20 causes the key to depress through the aligned keyhole in the light guide to contact the printed circuit board 50 to enact the desired electronic function.

According to the invention, a plurality of light coupling recesses 74 is provided on the peripheral edge 66 to transmit light into the light guide. The light coupling recesses 68 are preferably arcuately shaped, and more preferably semicircular. This feature helps to guide light from light sources uniformly into the light guide, thus avoiding bright and dark regions. In a preferred embodiment of the invention, the light coupling recesses are positioned on one side of the light guide in equally spaced relationship. In this way, a maximum amount of useful light is transmitted to illuminate a desired portion of the light guide, for example, that portion serving as a display screen backing. Alternatively, the light coupling recesses may be positioned as convenient around the periphery of the light guide for a desired illumination pattern.

According to another aspect of the invention, a plurality of reflecting recesses 76 are provided on the peripheral edge 66 to reflect light striking the peripheral edge toward the key holes 72. The light guide 60 also includes a plurality of light source apertures 80 positioned between the rows of key holes 72 to provide light to the key hole area. Light sources mounted on the printed circuit board 50 extend through the apertures 80 in the assembled telephone. The apertures 80 are positioned to provide substantially uniform light distribution through the central portion of the light guide. The light reflecting recesses 76 are positioned and shaped to reflect light from the peripheral edge 66 toward the key holes 72 so that the key holes are substantially uniformly illuminated on the interior and exterior facing sides by the light sources. As shown in FIG. 3, the light reflecting recesses 76 are positioned between adjacent keys hole locations. The reflecting recesses 76 as shown in FIG. 3 are V-shaped. Alternatively, the reflecting recesses may be arcuately shaped or multifaceted.

The light guide 60 also includes a mounting boss 82 having a hole located between the display screen area 70 and the key hole 72 area. A locating hole 84 is located at a corner of the key hole area. As described below, the mounting boss 82 and the locating hole 84 facilitate the assembly of the telephone by facilitating the rapid and correct alignment of various components, and also permit the formation of a front shell subassembly by providing a securing function.

The light guide 60 also includes two conductor mounting slots, a first slot 86 located adjacent to the screen area 70, and a second slot 88 located adjacent to the key hole 72 area. The first slot 86 is provided to allow connection between the printed circuit board 50 and the display screen 40 for powering and control of the display screen 40. The second slot 88 permits connection between the printed circuit board 50 and a microphone 34 mounted in the front shell 20. The slots 86, 88 are further described below in connection with FIGS. 6 and 7.

Figure 4:
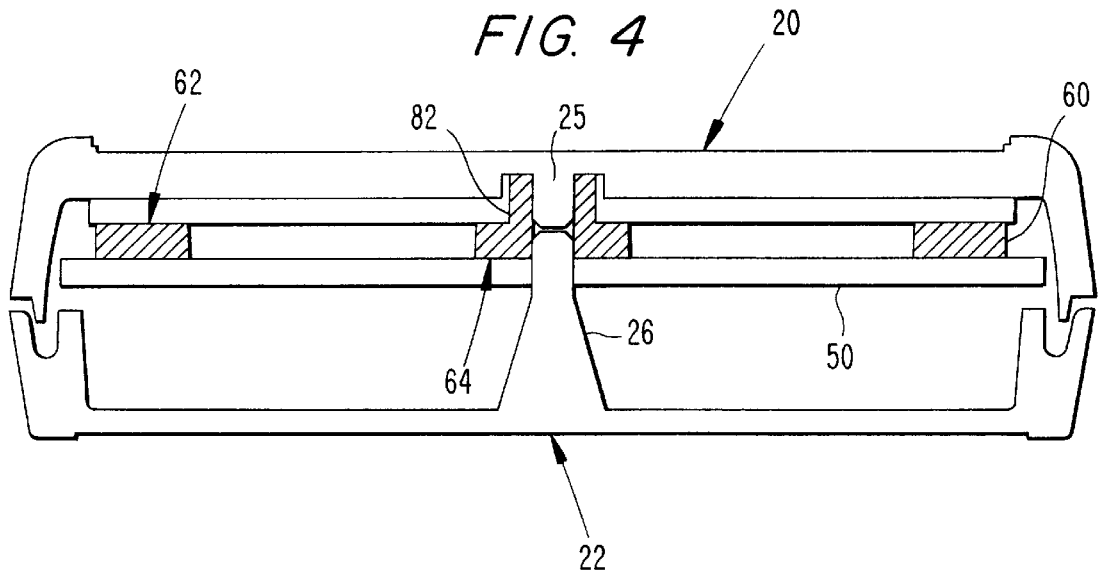
FIG. 4 is an end sectional view of a cellular telephone taken along the lines 4—4 indicated in FIG. 1 and FIG. 3.

FIG. 4 is a sectional view of the cellular telephone along the lines 4—4 in FIG. 1, which defines a plane through the mounting boss 82 of the light guide 60. The section line 4—4 is also shown in FIG. 3 to better indicate the location of the section.

Figure 5:
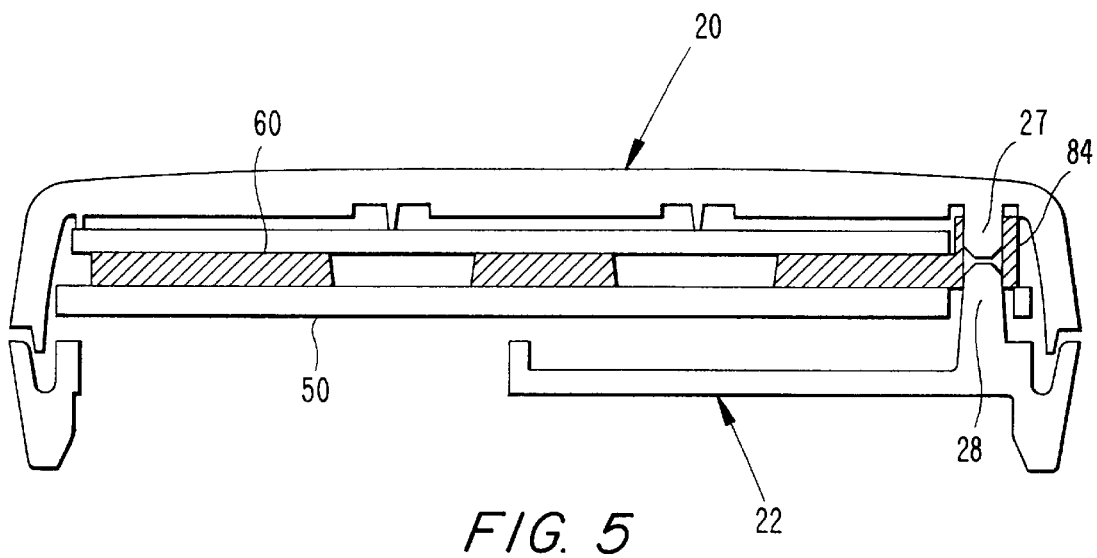
FIG. 5 is an end sectional view of the cellular telephone taken along the lines 5—5 indicated in FIG. 1 and FIG. 3.

FIG. 5 is a sectional view of the cellular telephone taken along the lines 5—5 in FIG. 1, on a plane through the locating hole 88 of the light guide. This sectional line 5—5 is also indicated in FIG. 3 for clarity.

Referring to FIG. 4, a mounting pin 25 in the front shell 20 is insertable in the mounting boss hole 82 of the light guide 60 from the top side 62 of the light guide. A second mounting pin 26 formed in the base shell 22 is insertable in the mounting boss hole 82 from the bottom side 26 of the light guide 60. The mounting pin 25 is formed for securable engagement in the mounting hole 82, that is, by force fit, or by a detent engagement in the hole, for example. In addition, the mounting pin 26 of the base shell 22 may also be formed for securable engagement in the mounting boss hole 82.

As seen in FIG. 5, a locating pin 27 in the front shell 20 is insertable in the locating hole 84 from the top side of the light guide 60, and a locating pin 28 in the base shell 22 is insertable in the location hole 84 from the bottom side of the light guide. The cooperation of the mounting pins 25, 26 and mounting hole 82 and the locating pins 27, 28 and locating hole 84 permit the front shell 20 and base shell 22 to be readily aligned. In addition, securable engagement of the mounting pin 25 in the mounting hole 82 retains the assembled components in place in the front shell 20. This facilitates further handling of the assembly while eliminating the risk of losing parts.

Figure 6:
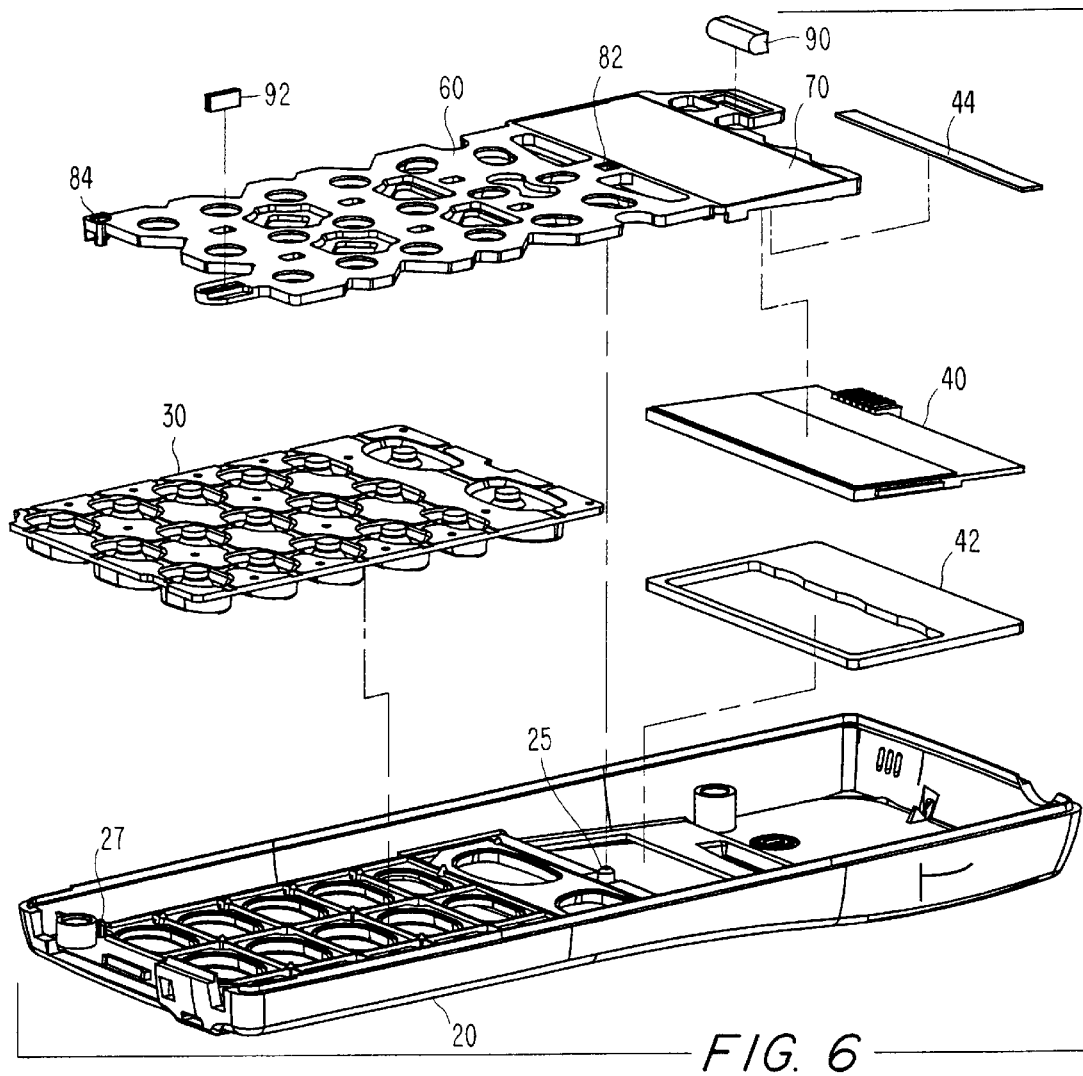
FIG. 6 is an exploded view of a front shell sub-assembly.
Figure 7:
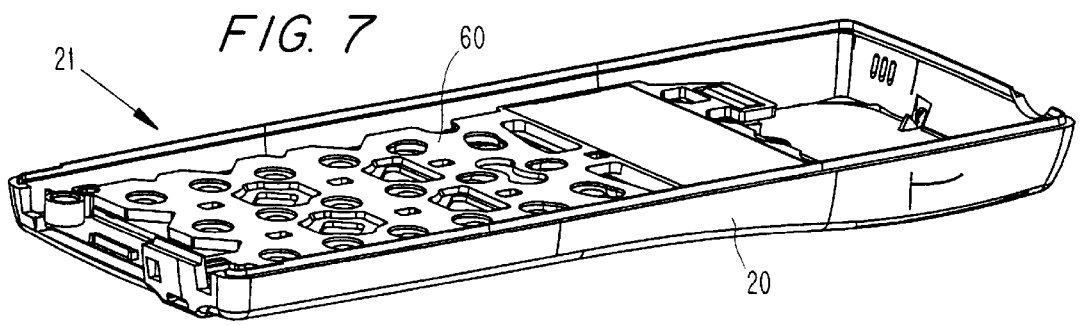
FIG. 7 is a perspective view of the front shell sub-assembly of FIG. 6.

One advantageous feature of the invention is the ability during manufacturing to form a sub-assembly including at least the front shell 20, keypad 40 and light guide 60. FIG. 6 illustrates a front shell subassembly 21 in accordance with the invention. As may be understood by reference to FIG. 6, a front shell subassembly 21 may be formed by placing the keypad 40 in the front shell 20 so that the keys 32 extend through the keyholes 24. The display screen 40, which includes a frame 42, is fastened to the light guide 60 at the screen backing area 70 by an adhesive strip 44 or other suitable means. By positioning the light guide 60 in the front shell 20 so that the mounting pin 25 and locating pin 27 align with the mounting hole 82 and locating hole 84, respectively, and pressing on the light guide to securably engage the mounting pin 25 and mounting hole 84, these components may be assembled into a unit 21, shown in FIG. 7, that is readily formed, and easily handled before and during further assembly of the telephone.

Also shown in FIG. 6 are conductors 90, 92 that may be positioned in the first and second conductor slots 86, 88. These conductors 90, 92 connect the display screen 40 and the microphone 34 (see FIG. 2) to the printed circuit board 50. The conductors 90, 92 may be formed of an elastomer with included conductive material, for example. The conductor slots 86, 88 are formed for frictional engagement with the conductors 90, 92, to retain the conductors in a subassembly shown in FIG. 6 and FIG. 7. Alternatively, a small amount of adhesive may be placed in the slots 86, 88 to retain the conductors.

Referring again to FIG. 2, the printed circuit board 50 has holes 52, 54 that permit the mounting pin 26 and locating pin 28 of the base shell 22 to extend therethrough. The assembly method according to the invention further includes the step of positioning a printed circuit board 50 in the base shell 22 so that the pins 26, 28 extend through the holes 52, 54, and then positioning the front shell assembly 21 in alignment with the rear shell by use of the mounting pins and location pins and corresponding mounting hole 82 and locating hole 84 in the light guide 60. The front shell assembly 21 is then pressed onto the base shell 22 to engage the base shell mounting pin 26 and the mounting hole 82. The thus formed assembly is secured for further handling, but may be easily disassembled if needed by pulling apart the front shell 20 and rear shell 22.

The principle of mounting and locating pins may be used in conjunction with only one of the front shell or base shell, if convenient. For example, a mounting pin and locating pin may be formed only on the base shell, and a method for assembly would include steps of placing the printed circuit board, light guide and keypad, in that order, in the base shell. Alternatively, a mounting pin and locating pin may be formed only on the front shell, having sufficient length to extend through the light guide and the printed circuit board, and the assembly would include placing the printed circuit board in the front shell on the light guide. In such a case, it is advantageous to form the mounting hole in the printed circuit board for securably engagement with the mounting pin of the front shell.

The described principles, features, and preferred embodiments of the invention are intended to be illustrative rather than limiting, and changes, modifications and equivalents may be used by others without departing from the scope the invention as defined in the following claims.

What is claimed is:

1. A telephone assembly, comprising:
   a front shell having a mounting pin and a locating pin, and having a plurality of keyholes;
   a base shell;
   a keypad having a plurality of keys, the keypad positioned in the front shell with the keys extending through the keyholes; and
   a light guide formed of a substantially translucent material and having a substantially planar shape, the light guide having a mounting boss with a hole therethrough for frictionally engaging the mounting pin of the front shell, the light guide further having a locating hole for accepting the locating pin of the front shell,
   wherein, the light guide is secured to the front shell by the mounting pin frictionally engaging the mounting boss hole with the light guide holding the keypad in position, the light guide, keypad, and front shell forming a subassembly.

2. The telephone assembly of claim 1, wherein the base shell comprises a mounting pin inserted in the mounting boss hole and frictionally engaged therein and a locating pin inserted in the locating hole, and wherein the front shell and base shell are alignable for assembly by alignment of the base shell and front shell mounting pins with the mounting bass hole and the base shell locating pin front shell locating pin with the locating hole.

3. The telephone assembly of claim 2, further comprising a printed circuit board disposed in the base shell, and having a hole through which the mounting pin of the base shell extends.

4. The telephone assembly of claim 1, further comprising a printed circuit board disposed in the base shell, and having a hole through which the front shell mounting pin extends.

5. The telephone assembly of claim 1, wherein the front shell has a window and the light guide has a display panel backing portion, and further comprising a display screen positioned at the window in the front shell between the display panel backing portion of the light guide and the front shell.

6. The telephone assembly of claim 5, wherein the light guide includes a first conductor slot adjacent to the screen backing portion, and the telephone further comprises a printed circuit board disposed between the light guide and the base shell and a block-shaped conductor disposed in the first conductor slot and abutting the printed circuit board and the display screen to electrically connect the printed circuit board to the display screen.

7. The telephone assembly of claim 1, wherein the telephone includes a microphone disposed in the front shell and a printed circuit board disposed between the light guide and the base shell, and the light guide includes a slot, and further comprising a block shaped conductor disposed in the slot and abutting the printed circuit board and the microphone to electrically connect the printed circuit board to the microphone.

8. A method for assembling a cellular telephone, comprising the steps of:

placing a keypad having a plurality of keys in a front shell with the keys extending through keyhole in the front shell;

positioning the light guide in the front shell;

fastening the light guide to the front shell by inserting a mounting pin on the front shell into a mounting hole in the light guide, the mounting hole frictionally engaging the mounting pin, and simultaneously inserting a locating pin on the front shell in a locating hole in the light guide, wherein a front shell subassembly including the light guide and keypad is formed;

aligning a base shell with the front shell by positioning a base shell mounting pin in alignment with the mounting hole in the light guide, and positioning a locating pin in the base shell in alignment with the locating hole in the light guide; and fastening the base shell to the front shell by inserting the base shell mounting pin in the mounting hole in the light guide, the mounting hole frictionally engaging the base shell mounting pin.

9. The method as claimed in claim 8, further comprising the step of disposing a display panel between the light guide and a display window in the front shell before fastening the light guide to the front shell.

10. The method as claimed in claim 8, wherein the display screen is fastened to a screen backing portion of the light guide before the light guide is positioned in the front shell.

11. The method as claimed in claim 8, further comprising the step of disposing a printed circuit board in the base shell by aligning holes in the printed circuit board with the mounting pin and locating pin of the base shell.

12. The method as claimed in claim 8, further comprising the steps of placing a first block shaped conductor for connecting a display screen and a printed circuit board in a first conductor holding slot in the light guide, and placing a second block shaped conductor for connecting a microphone with the printed circuit board in a second conductor holding slot in the light guide.

* * * * *